United States Patent Office 2,894,818
Patented July 14, 1959

2,894,818

SEPARATION OF RUTHENIUM FROM AQUEOUS SOLUTIONS

Morris Beederman, Seymour Vogler, and Herbert H. Hyman, Chicago, Ill., assignors to the United States of America as represented by the United States Atomic Energy Commission No Drawing. Application December 20, 1950
Serial No. 201,886

16 Claims. (Cl. 23—140)

This invention deals with the separation of ruthenium values from aqueous solutions and in particular with the oxidation of ruthenium values with ozone and volatilization of the ruthenium tetroxide formed thereby.

It is an object of this invention to provide a process for eliminating ruthenium values from aqueous solutions which does not necessitate the addition of deleterious amounts of foreign anions so that no undesirable reaction products are formed in the solution by the reaction.

It is another object of this invention to provide a process for eliminating ruthenium values from aqueous solutions in which the quantity of ozone required is reduced as compared with the amount necessary in previous processes.

It is still another object of this invention to provide a process in which the ozone-containing gas may be passed through the solution in a reduced flow rate as compared with previous processes.

It is still another object of this invention to provide a process by which a practically complete removal of the ruthenium may be obtained in a relatively short time.

Ozone has been previously used in a carrier gas for volatilizing ruthenium from aqueous solution. It has also been suggested heretofore to carry out the ozonization and volatilization of ruthenium in the presence of catalysts, such as permanganate anions, dichromate anions, silver cations, Ce(IV) cations, cobalt cations, nickel cations, periodate anions, bromate anions and lead dioxide.

It has now been found that the efficiency of the process is considerably improved if the ozonization is carried out in the presence of nitrite anions. The nitrite anion cooperates with the ozone to bring about such a favorable effect; the nature of this cooperative reaction is not known. The preferred embodiment is to use, in addition to nitrite, one of the catalysts listed above.

After the addition of the nitrite anion-containing substance, it is advantageous to allow a certain interval prior to ozonization. For this purpose, the solution may either be allowed to stand for several hours, or else it may be digested at elevated temperature, for instance at about 90° C. for about four hours.

It is advantageous, though not obligatory, to use the ruthenium-containing solution in acid form. Sulfuric acid, hydrochloric acid and nitric acid are suitable acids for this purpose. Studies carried out on the effect of various acid concentrations on the yield of the process showed that the acidity can be varied widely, e.g., within the range of from 0.1 to 5 N. A nitric acid concentration of 0.3 N has given excellent results.

The ozone is preferentially passed through the aqueous solution to be treated in mixture with a diluent gas, such as oxygen, air and nitrogen. The concentration of the ozone in this mixture can be varied considerably, and concentrations ranging from 1 to 5% by weight have been found suitable; however, a concentration of at least 2.5% by weight is preferred.

The nitrite anion may be added in the form of any water-soluble salt; sodium nitrite, for instance, is satisfactory. A nitrite concentration of 0.001 to 0.5 M is suitable. Since the nitrite is present in catalytic amounts only, the oxidation must be due to the ozone. The effect of the concentration of the nitrite on the efficiency of the process has also been studied and found to have some bearing thereon as is obvious from the following example.

One set of experiments was carried out with five 10-cc. samples of 2 M uranyl nitrate solution obtained by dissolution of neutron-irradiated uranium and hereinafter referred to as dissolver solution. Each sample was diluted to 50 cc. with a 2 M solution of inactive uranyl nitrate in order to reduce the activity of the solution. Nitric acid was then added to each of the three samples in a quantity to obtain a concentration of 0.3 N. Silver salt was added to four of the solutions to obtain an $Ag^+$ concentration of 0.025 M. Thereafter sodium nitrite was added to each solution to obtain concentrations of 0.001 M, 0.01 M, 0.05 M, 0.01 M, and 0.01 M, respectively. Each solution was then allowed to stand for three hours whereupon ozonization was carried out while the solutions were held at a temperature of 95° C. An oxygen-ozone mixture containing 3.4% by volume of ozone was used at a flow rate of 100 cc./min. The results of these tests are given in the following table.

Table I

| Time, hrs. | Percent Ruthenium Remaining | | | | |
|---|---|---|---|---|---|
| | 0.001 M $NaNO_2$ | 0.01 M $NaNO_2$ | 0.05 M $NaNO_2$ | 0.01 M [1] $NaNO_2$ | 0.01 M [2] $NaNO_2$ |
| 0 | 100 | 100 | 100 | 100 | 100 |
| 2 | 12.8 | 2.5 | 4.1 | 6.1 | 30.0 |
| 3 | | | 1.4 | 2.6 | 7.7 |
| 3.5 | 3.1 | | 0.7 | | |
| 4 | | | | 2.3 | 5.2 |
| 6 | 1.9 | | 0.16 | | |
| 7 | | | | 1.2 | 1.7 |
| 7.5 | 1.5 | 0.70 | 0.17 | | |
| 10 | | 0.51 | | 0.66 | 1.2 |
| 10.5 | 0.47 | | 0.06 | | |

[1] Additional nitrite (equivalent to 0.01 M) added after three hours and solution allowed to stand overnight before resuming ozonization.
[2] Additional nitrite added; no $Ag^+$ present in this run.

These tests illustrate that the concentration of the nitrite affects the oxidation and volatilization rate and that a concentration of about from 0.01 M to 0.05 M yielded the best results.

While the process may be carried out with the solution at room temperature, the results are considerably improved by using elevated temperature up to near the boiling point of the solution. For instance, a temperature between 90° and 100° C., and preferably 95° C., was found advantageous.

In order to study the effect of the temperature on the efficiency of the process, a series of tests was carried out under identical conditions but at varying temperatures. In these tests, four samples of 10 cc. each of dissolver solution were diluted to 50 cc. with 2 M uranyl nitrate. These solutions were then made 0.01 M in $NO_2^-$, 0.025 M in $Ag^+$ and 0.3 N in $H^+$. The ozone-oxygen mixture again contained 3.4% by volume of ozone and had a flow rate of 100 cc./min. The results of the experiments are compiled in Table II.

Table II

| Time, hrs. | Percent Ruthenium Remaining | | | |
|---|---|---|---|---|
| | 95° C. | 75° C. | 50° C. | Room temperature |
| 0 | 100 | 100 | 100 | 100 |
| 2 | 2.5 | 25.6 | 62.2 | 106.3 |
| 3 | 1.4 | | | |
| 4 | | 6.8 | 22.7 | 116.2 |
| 7 | | 3.0 | 11.5 | 110.5 |
| 7.5 | 0.70 | | | |
| 10 | 0.51 | | | |
| 11.5 | | 2.6 | 7.2 | |

As has been mentioned above, the ozone gas is preferably introduced in mixture with a diluent gas. A series of experiments was carried out in order to study the effect of the ozone concentration in the gas mixture. For this purpose, four samples of solution composed identically as those used in the experiments of Table II were treated with different oxygen-ozone mixtures. The results are listed in Table III.

Table III

| Time, hrs. | Percent Ruthenium Remaining | | | |
|---|---|---|---|---|
| | 3.4% O$_3$ by volume | 2.5% O$_3$ by volume | 2.0% O$_3$ by volume | 1.5% O$_3$ by volume |
| 0 | 100 | 100 | 100 | 100 |
| 2 | 2.5 | 5.0 | 27.4 | 6.35 |
| 3 | 1.4 | 3.1 | | |
| 4 | | | 7.2 | 36.5 |
| 7 | | | 1.3 | 15.4 |
| 7.5 | 0.70 | 0.35 | 1.2 | 9.3 |
| 10 | 0.51 | 0.74 | | |

The relationship between percent by weight and percent by volume of ozone in oxygen is tabulated below for these experiments.

| Percent by weight of O$_3$ in O$_2$ | 4.6 | 3.4 | 2.8 | 2.1 |
|---|---|---|---|---|
| Percent by volume of O$_3$ in O$_2$ | 3.4 | 2.5 | 2.0 | 1.5 |

Table III illustrates that ozone concentrations of from 2 to 3.4% by volume yield considerably better results than a concentration of 1.5%.

The flow rate of the ozone gas mixture is not critical; however, for economical reasons it is preferred to use as low a flow rate as possible. Due to the favorable effect of the nitrite anion, an extremely low flow rate is satisfactory; for instance, for an ozone concentration of about 1% by volume a flow rate of 2 cc./min./cc. of solution is sufficient, and 99.5% of the ruthenium present are removed from the diluted dissolver solution, 0.01 M in nitrite and 0.025 M in Ag+, after a treatment of twelve hours at 95° C. In contradistinction thereto, without the use of nitrite anion, 99.0% removal was obtained after treatment with oxygen containing 5% ozone when a thirty-fold gas rate was applied for twenty hours. Thus 150 times as much ozone was required for the same result.

The process has been successfully carried out under widely varying conditions of gas rate (from 2 to 30 volumes of gas per volume of solution per minute), of ozone concentration in the gas mixture (from 1 to 5% by weight) and with various types of diluents for the ozone, such as oxygen and air.

In the following Table IV the results of two experiments are compiled; these experiments were carried out with the same type of solutions used in the previous examples. The operating conditions likewise were identical with those used in the experiments of Table II. In one experiment of Table IV, nitrite was used together with the silver cation in a concentration of 0.025 M, while in the other set the nitrite was used without a catalyst.

Table IV

| Time, hrs. | Percent Ruthenium Remaining | |
|---|---|---|
| | No catalyst | 0.025 M Ag+ |
| 0 | 100 | 100 |
| 2 | | 2.5 |
| 2.5 | 16.0 | |
| 3 | | 1.4 |
| 5 | 3.9 | |
| 7 | 2.5 | |
| 7.5 | | 0.70 |
| 10 | 2.0 | 0.51 |

These experiments illustrate the favorable effect of 0.025 M silver cation.

The process of this invention is particularly advantageous in the solvent extraction process for the separation of uranium and plutonium from fission products. In this process ruthenium, which is a fission product, has always been a complicating factor because it is extracted together with uranium and with plutonium and difficult to separate therefrom. This fact made it necessary for complete separation to apply a great number of solvent extraction cycles. This disadvantage is overcome by the process of this invention, since practically the entire amount of the ruthenium may be removed prior to solvent extraction. Another instance where this process has utility, is in the precipitation of plutonium with a carrier precipitate from aqueous solutions. Also there it is useful to remove the ruthenium prior to precipitation.

The process of this invention is also useful in the removal and recovery of ruthenium values from aqueous solutions obtained by the leaching of ruthenium-containing ores.

The process is further useful in the recovery of radioactive ruthenium from aqueous solutions of uranium values freed of plutonium by any of various well-known processes.

It will be understood that this invention is not to be limited to the details given herein but that it may be modified within the scope of the appended claims.

The copending application, Serial No. 187,148, filed by Herbert H. Hyman and Gordon R. Leader on September 27, 1950, covers the recovery of ruthenium from aqueous, nitric acid-containing solutions by solvent extraction.

What is claimed is:

1. A process for separating ruthenium values from an aqueous solution, which comprises adding nitrite anions to said solution and passing ozone therethrough whereby ruthenium tetroxide is formed and volatilized.

2. The process of claim 1 wherein the aqueous solution is a mineral acid solution.

3. The process of claim 2 wherein the solution is brought to an elevated temperature up to near its boiling point.

4. The process of claim 3 wherein the temperature is between 90° and 100° C.

5. A process for separating ruthenium values from an aqueous solution, which comprises adding nitrite anions to said solution, and passing a gas mixture containing ozone and a diluent gas therethrough whereby ruthenium tetroxide is formed and volatilized.

6. The process of claim 5 wherein the gas mixture contains from 1 to 5% by weight of ozone.

7. The process of claim 6 wherein the gas mixture contains at least 2.5% by weight of ozone.

8. The process of claim 5 wherein the diluent gas is oxygen.

9. The process of claim 5 wherein the diluent gas is nitrogen.

10. The process of claim 5 wherein the diluent gas is air.

11. The process of claim 5 wherein the nitrite anions are present in a concentration of from 0.001 to 0.5 M.

12. A process for separating ruthenium values from an aqueous solution, which comprises adding silver cations and nitrite anions to said solution, and passing a gas mixture containing ozone and a diluent gas through said solution whereby ruthenium tetroxide is formed and volatilized.

13. The process of claim 12 wherein the silver cations are present in a concentration of approximately 0.025 M.

14. The process of claim 13 wherein the nitrite anions are present in a concentration of about 0.01 to 0.05 M.

15. A process for separating ruthenium values from an aqueous solution, which comprises adding nitrite anions to said solution, allowing said solution to stand for several hours, and passing a gas mixture containing ozone and a diluent gas through said solution whereby ruthenium tetroxide is formed and volatilized.

16. A process for separating ruthenium values from an aqueous solution, which comprises adding nitrite anions to said solution, digesting said solution at approximately 90° C. for about four hours, and passing a gas mixture containing ozone and a diluent gas through said solution whereby ruthenium tetroxide is formed and volatilized.

No references cited.